United States Patent
Onishi

(10) Patent No.: US 9,924,121 B2
(45) Date of Patent: Mar. 20, 2018

(54) SOLID-STATE IMAGING DEVICE AND METHOD OF DRIVING THE SAME TRANSFERRING OTHER PART OF CHARGES TO A COMBINED CAPACITOR

(71) Applicant: CANON KABUSHIKI KAISHA, Tokyo (JP)

(72) Inventor: Tomoya Onishi, Ayase (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/698,217

(22) Filed: Apr. 28, 2015

(65) Prior Publication Data

US 2015/0319384 A1    Nov. 5, 2015

(30) Foreign Application Priority Data

May 1, 2014    (JP) ................................ 2014-094462

(51) Int. Cl.
*H04N 5/3745*    (2011.01)
*H04N 5/355*    (2011.01)
(Continued)

(52) U.S. Cl.
CPC ......... *H04N 5/3745* (2013.01); *H04N 5/3559* (2013.01); *H04N 5/3741* (2013.01); *H04N 5/37452* (2013.01); *H04N 5/37457* (2013.01); *G06T 5/007* (2013.01); *G06T 2207/20208* (2013.01)

(58) Field of Classification Search
CPC ............. H04N 5/3745; H04N 5/37457; H04N 5/3559; H04N 5/3741; H04N 5/37452; H04N 5/2355; H04N 5/2356; H04N 5/355; G06T 5/007; G06T 2207/20208

See application file for complete search history.

(56) References Cited

U.S. PATENT DOCUMENTS 7,075,049 B2 * 7/2006 Rhodes ............. H01L 27/14603
                                                                  250/208.1
7,432,540 B2 * 10/2008 McKee ............. H01L 27/14603
                                                                  250/208.1
(Continued)

FOREIGN PATENT DOCUMENTS

JP    2006-262387 A    9/2006

*Primary Examiner* — Twyler Haskins
*Assistant Examiner* — Akshay Trehan
(74) *Attorney, Agent, or Firm* — Fitzpatrick, Cella, Harper & Scinto

(57) ABSTRACT

A solid-state imaging device includes a pixel that includes a photoelectric conversion element that generates signal charges by photoelectric conversion, a first capacitor, a second capacitor, and an amplifier transistor. At least a part of charges of the signal charges generated by the photoelectric conversion element are held by the first capacitor and are not held by the second capacitor. The amplifier transistor outputs a first signal based on the part of the charges that the first capacitor holds. The part of the charges of the first capacitor are reset, and a combined capacitor of the first capacitor and second capacitor holds other part of charges of the signal charges generated by the photoelectric conversion element. The amplifier transistor outputs a second signal based on the other part of the charges that the combined capacitor holds.

14 Claims, 11 Drawing Sheets

(51) Int. Cl.
*H04N 5/374* (2011.01)
*G06T 5/00* (2006.01)

(56) References Cited

U.S. PATENT DOCUMENTS

| | | | | |
|---|---|---|---|---|
| 8,174,602 B2* | 5/2012 | Vampola | ............ | H01L 27/14609 348/294 |
| 8,847,136 B2* | 9/2014 | Ayers | ................ | H01L 27/14609 250/208.1 |
| 2004/0251394 A1* | 12/2004 | Rhodes | ............. | H01L 27/14603 250/208.1 |
| 2005/0224843 A1* | 10/2005 | Boemler | ............ | H01L 27/14603 257/233 |
| 2008/0252742 A1* | 10/2008 | Oike | .................... | H04N 5/3741 348/222.1 |
| 2009/0272879 A1* | 11/2009 | Dai | ...................... | H04N 5/3559 250/208.1 |
| 2012/0256077 A1* | 10/2012 | Yen | ................... | H01L 27/14609 250/208.1 |
| 2013/0176470 A1 | 7/2013 | Kobayashi et al. | | |

* cited by examiner

SOLID-STATE IMAGING DEVICE AND METHOD OF DRIVING THE SAME TRANSFERRING OTHER PART OF CHARGES TO A COMBINED CAPACITOR

BACKGROUND OF THE INVENTION

Field of the Invention

The present invention relates to a solid-state imaging device and a method of driving the solid-state imaging device.

Description of the Related Art

In recent years, the general use of imaging systems (digital video cameras and digital still cameras and the like) that use CMOS image sensors that are suitable for low-power-consumption requirements and high-speed readout operations has become widespread.

As one example of a CMOS image sensor, Japanese Patent Application Laid-Open No. 2006-262387 discloses a solid-state imaging device configured to generate charges by photoelectric converting incident light by a photoelectric conversion element, transfer the generated charges to a floating diffusion capacitor, and output a pixel signal based on the charges held in the floating diffusion capacitor. The solid-state imaging device disclosed in Japanese Patent Application Laid-Open No. 2006-262387 further includes a charge holding portion connected to the floating diffusion capacitor.

According to the solid-state imaging device disclosed in Japanese Patent Application Laid-Open No. 2006-262387, signal charges that overflow from the photoelectric conversion element during an exposure period can be accumulated in the charge holding portion provided separately from the floating diffusion capacitor. By also reading out the signal charges that overflowed and accumulated in the charge holding portion, the dynamic range of an output signal can be expanded in comparison to the case of reading out only signal charges transferred from the photoelectric conversion element to the floating diffusion capacitor.

Further, after the exposure period of the photoelectric conversion element, correlated double sampling can be performed by reading out an output signal based on a noise charge after resetting the floating diffusion capacitor, and thereafter reading out an output signal based on signal charges accumulated in the photoelectric conversion element after transferring the signal charges from the photoelectric conversion element to the floating diffusion capacitor. Correlated double sampling can also be performed by reading out an output signal based on signal charges overflowed from the photoelectric conversion element after transferring the signal charges from the charge holding portion to the floating diffusion capacitor, and thereafter reading out an output signal based on a noise charge after resetting the charge holding portion. It is thereby possible to perform highly accurate reading out of signals in a manner in which a noise component has been decreased.

However, according to the solid-state imaging device disclosed in Japanese Patent Application Laid-Open No. 2006-262387, when resetting of the floating diffusion capacitor is performed after a charge accumulation period, some of the signal charges that accumulated in the floating diffusion capacitor when the signal charges overflowed are reset in some cases, and therefore the accuracy with respect to reading out the photoelectric conversion signals declines.

SUMMARY OF THE INVENTION

An object of the present invention is to provide a solid-state imaging device which enables signal charges obtained by photoelectric conversion to be read out with high accuracy and which can also expand the dynamic range of an output signal, as well as a method of driving the solid-state imaging device.

According to one aspect of the present invention there is provided a method of driving a solid-state imaging device having a pixel including a photoelectric conversion element that generates signal charges by photoelectric conversion, a first capacitor, a second capacitor, and an amplifier transistor, the method including holding at least a part of charges of the signal charges generated by the photoelectric conversion element by the first capacitor without holding by the second capacitor, outputting by the amplifier transistor a first signal based on the part of the charges that the first capacitor holds, resetting the first capacitor holding the part of the charges, and holding other part of the charges of the signal charges by a combined capacitor of the first capacitor and the second capacitor, and outputting by the amplifier transistor a second signal based on the other part of the charges that the combined capacitor holds.

According to another aspect of the present invention there is provided a solid-state imaging device including a pixel including a photoelectric conversion element that generates signal charges by photoelectric conversion, an amplifier transistor, a first capacitor electrically connected to an input node of the amplifier transistor, a second capacitor electrically connectable to the input node, a transfer transistor electrically connected to the photoelectric conversion element and the input node, and a reset transistor electrically connected to the input node, and a control unit, wherein the control unit is configured to cause the transfer transistor to transfer at least a part of charges of the signal charges generated by the photoelectric conversion element to the first capacitor without transferring to the second capacitor, cause the amplifier transistor to output a first signal based on the part of the charges that the first capacitor holds, cause the reset transistor to reset the first capacitor holding the part of the charges, cause the transfer transistor to transfer other part of charges of the signal charges to a combined capacitor of the first capacitor and the second capacitor that is constituted by causing the second capacitor to electrically connect to the input node, and cause the amplifier transistor to output a second signal based on the other part of the charges that the combined capacitor holds.

Further features of the present invention will become apparent from the following description of embodiments with reference to the attached drawings.

DESCRIPTION OF THE EMBODIMENTS

Preferred embodiments of the present invention will now be described in detail in accordance with the accompanying drawings.

First Embodiment

A solid-state imaging device and a method of driving the same according to a first embodiment of the present invention will be described with reference to FIG. 1 to FIG. 5.

Figure 1:
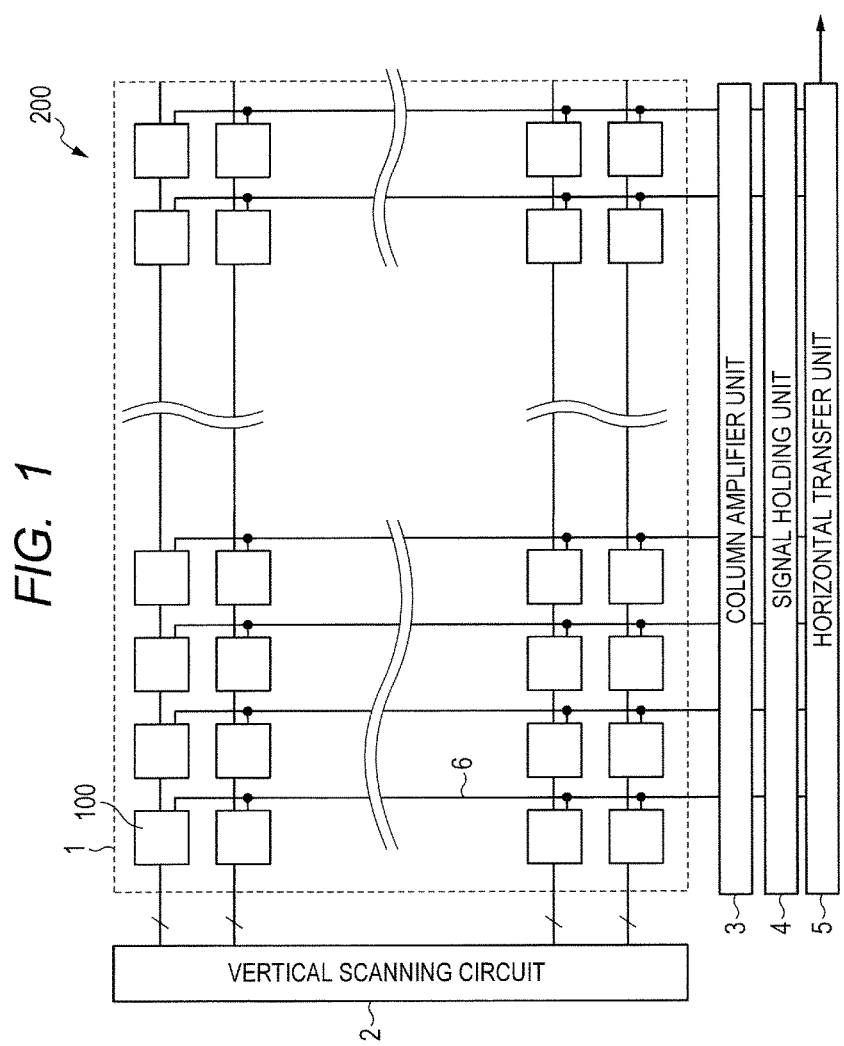
FIG. 1 is a block diagram illustrating one example of the configuration of a solid-state imaging device according to a first embodiment of the present invention.
Figure 2:
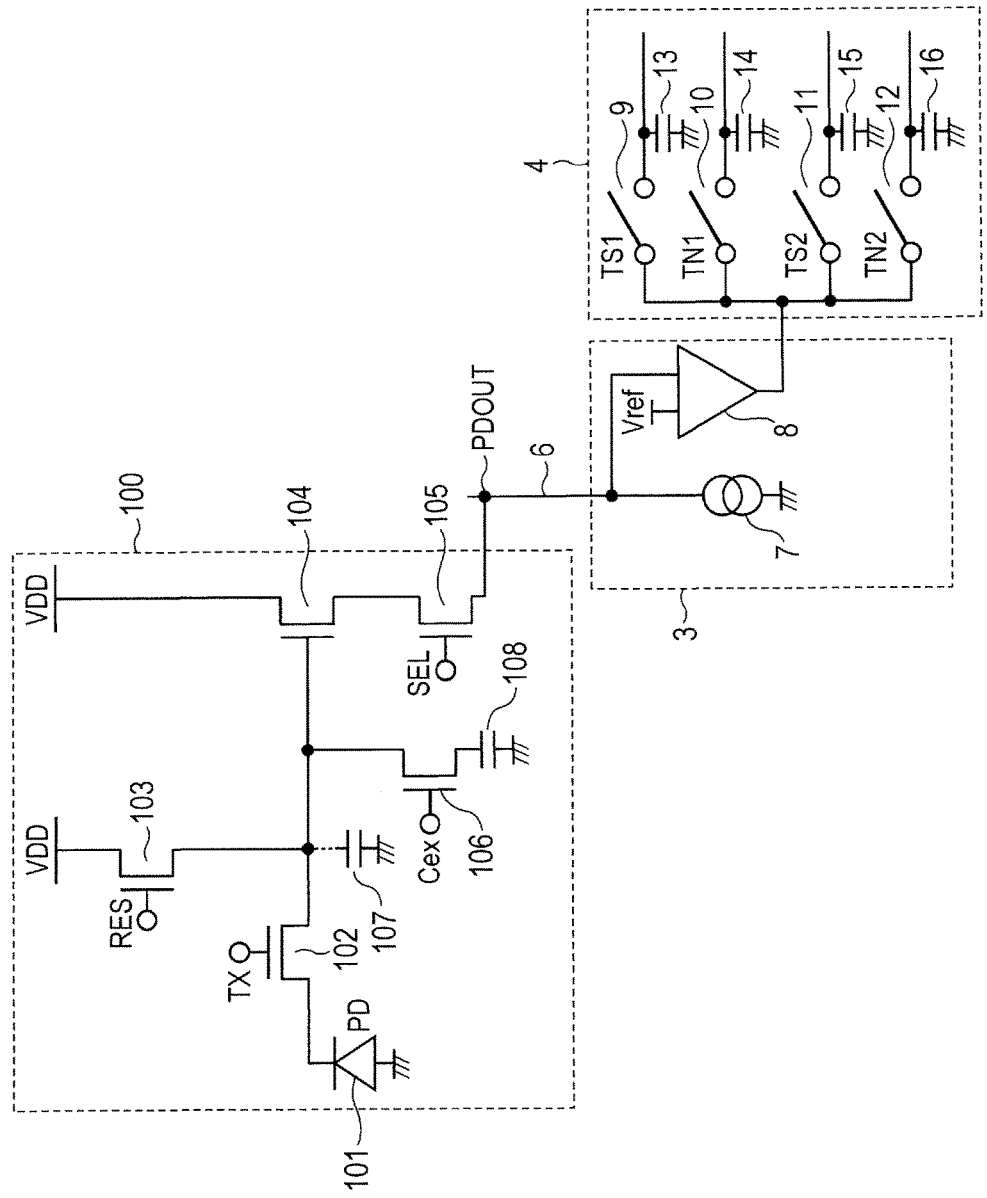
FIG. 2 is a circuit diagram illustrating one example of the configuration of the solid-state imaging device according to the first embodiment of the present invention.
Figure 3:
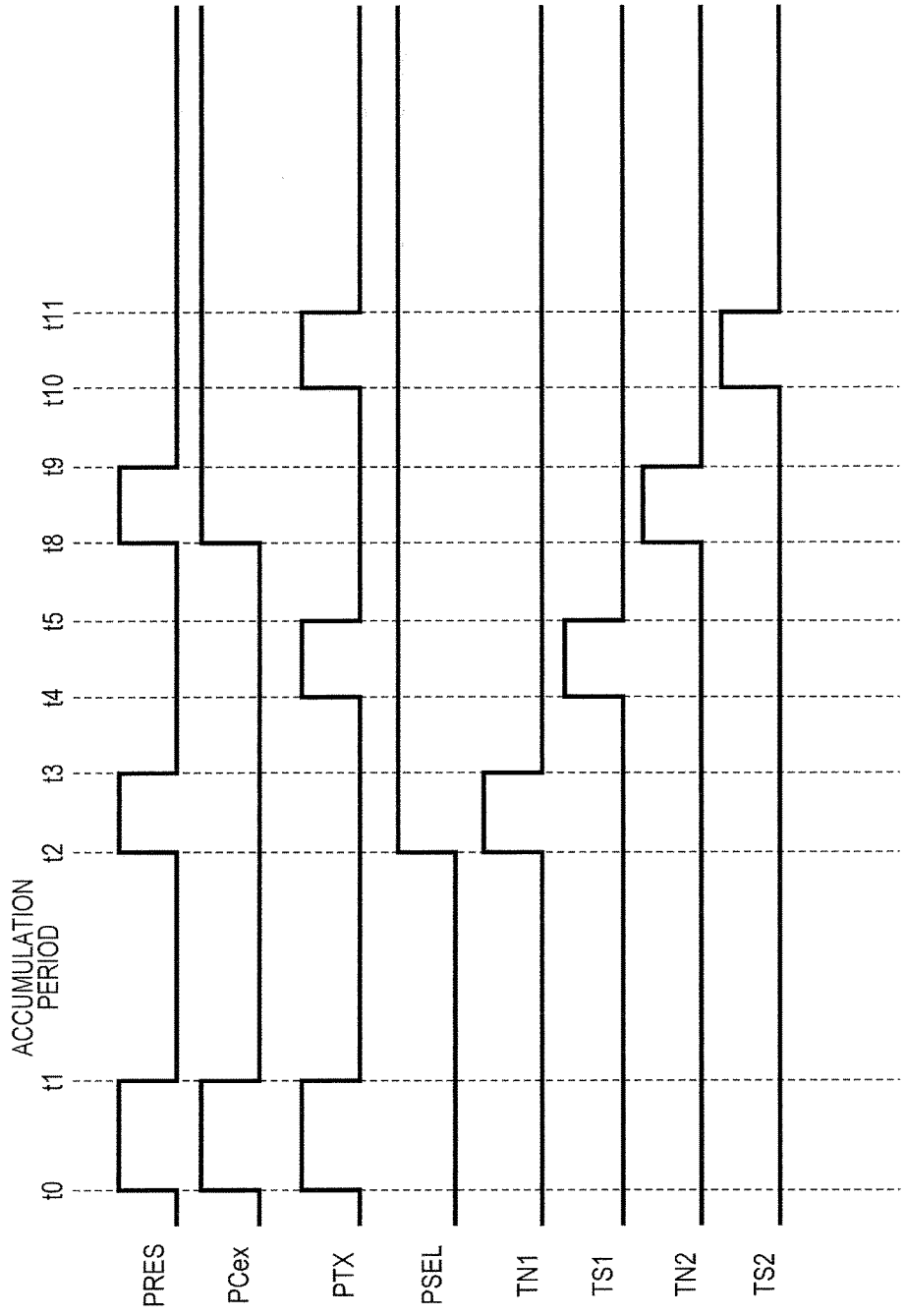
FIG. 3 is a timing chart illustrating one example of a method of driving the solid-state imaging device according to the first embodiment of the present invention.
Figure 4:
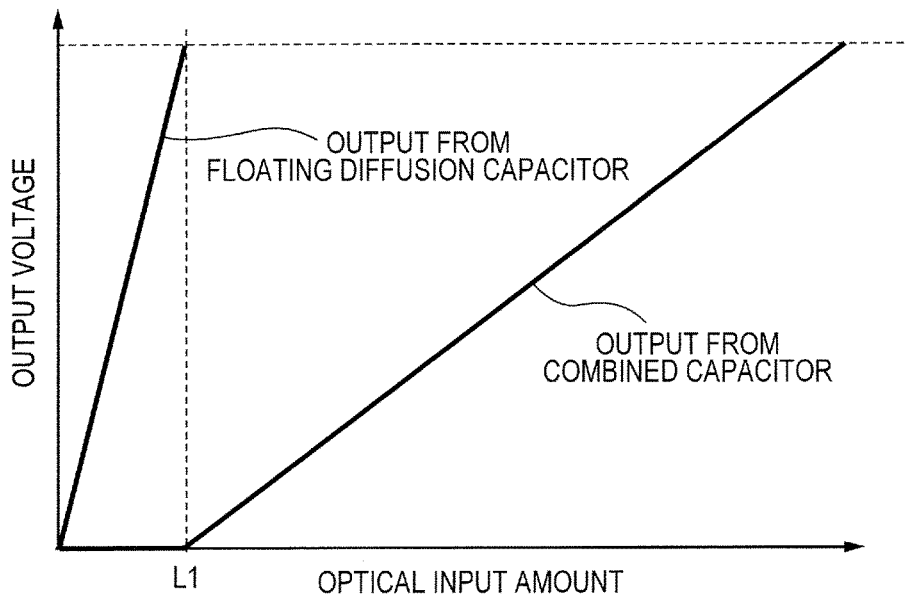
FIG. 4 is a graph illustrating the dependence with respect to an optical input amount of an output voltage in the solid-state imaging device according to the first embodiment of the present invention.
Figure 5:
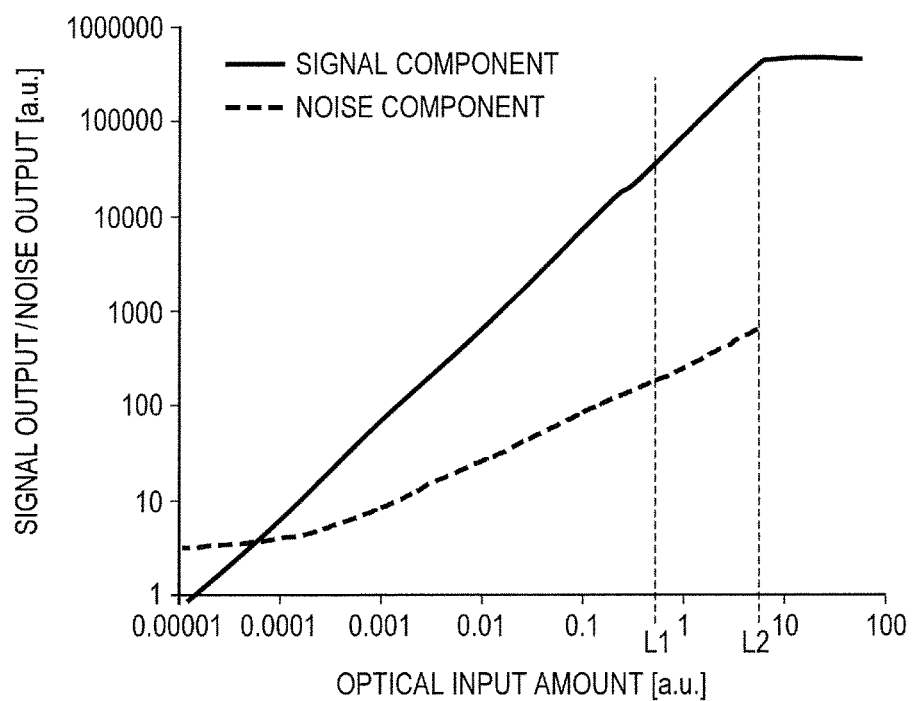
FIG. 5 is a graph illustrating the dependence with respect to an optical input amount of an output signal in the solid-state imaging device according to the first embodiment of the present invention.

FIG. 1 is a block diagram illustrating one example of the configuration of the solid-state imaging device according to the present embodiment. FIG. 2 is a circuit diagram illustrating one example of the configuration of the solid-state imaging device according to the present embodiment. FIG. 3 is a timing chart illustrating one example of the method of driving the solid-state imaging device according to the present embodiment. FIG. 4 is a graph illustrating the dependence with respect to an optical input amount of an output voltage in the solid-state imaging device according to the present embodiment. FIG. 5 is a graph illustrating the dependence with respect to an optical input amount of an output signal in the solid-state imaging device according to the present embodiment.

First, the structure of the solid-state imaging device according to the present embodiment will be described with reference to FIG. 1 and FIG. 2.

A solid-state imaging device 200 according to the present embodiment has an imaging region 1 that includes a pixel array in which a plurality of pixels 100 is arranged in a two-dimensional matrix shape. A vertical scanning circuit 2, that outputs control signals for driving and reading out pixel signals from respective pixels 100, is provided adjacent to the imaging region 1 in the row direction (lateral direction in the drawing). In the present specification, a driving unit for driving the pixels 100 that includes the vertical scanning circuit 2 may also be referred to as a "control unit." A column amplifier unit 3, a signal holding unit 4 and a horizontal transfer unit 5 for processing pixel signals that are read out from respective pixels 100 are also provided adjacent to the imaging region 1 in the column direction (longitudinal direction in the drawing). In the present specification, a unit for generating output signals of pixels, that includes the column amplifier unit 3, the signal holding unit 4, and the horizontal transfer unit 5, may also be referred to as an "output signal generation unit."

Each pixel 100 includes a photodiode 101, a transfer transistor 102, a reset transistor 103, a source follower transistor 104, a select transistor 105, an additional capacitor select transistor 106 and an additional capacitor 108. In the present specification, the source follower transistor 104 may also be referred to as an "amplifier transistor."

An anode of the photodiode 101 that is a photoelectric conversion element is grounded, and a cathode thereof is electrically connected to a source of the transfer transistor 102. A drain of the transfer transistor 102 is electrically connected to a source of the reset transistor 103, a gate of the source follower transistor 104 and a drain of the additional capacitor select transistor 106. This connection node constitutes a floating diffusion node (hereunder, referred to as an "FD node"). In the drawings, a parasitic capacitor of the FD node is represented as a floating diffusion capacitor 107. Drains of the reset transistor 103 and the source follower transistor 104 are electrically connected to a power supply voltage line. A drain of the select transistor 105 is electrically connected to a source of the source follower transistor 104. A source of the select transistor 105 constitutes a node PDOUT that is an output node for a signal from the pixel 100. One of the nodes of the additional capacitor 108 is electrically connected to a source of the additional capacitor select transistor 106. The other node of the additional capacitor 108 is given a fixed potential (for example, ground potential). The additional capacitor select transistor 106 is a switch for switching an electrical path between the gate of the source follower transistor 104 that is an input node of the source follower transistor 104 and the additional capacitor 108 between conductive and non-conductive states. By this means, the additional capacitor 108 is made electrically connectable to the input node of the source follower transistor 104.

Note that, although the meanings of the terms "source" and "drain" of a transistor may differ depending on the conductivity type or function of interest of the transistor or the like, in this case the terms "source" and "drain" refer to the typical node names when using an NMOS transistor. Further, a transistor is sometimes referred to as a "switch". In the case of referring to a transistor as a "switch," one of the source and the drain may be referred to as "one main node" and the other of the source and the drain may be referred to as "another main node" and the gate may be referred to as a "control node."

A signal line TX, a signal line RES, a signal line SEL and a signal line Cex that extend in the row direction are respectively arranged in each row of the pixel array. In FIG. 1, these four signal lines are represented by a single solid line. Each of the signal line TX is electrically connected to a gate of the transfer transistor 102 of each of the pixels 100 that are aligned in the row direction, and serves as a common signal line for these pixels 100. One end of the signal line TX is connected to the vertical scanning circuit 2, and the signal line TX is configured to be capable of applying a signal PTX to the gates of the transfer transistors 102 of the pixels 100 on the corresponding row from the vertical scanning circuit 2. Each of the signal line RES is electrically connected to a gate of the reset transistor 103 of each of the pixels 100 aligned in the row direction, and serves as a common signal line for these pixels 100. One end of the signal line RES is connected to the vertical scanning circuit 2, and the signal line RES is configured to be capable of applying a signal PRES to the gates of the reset transistors 103 of the pixels 100 on the corresponding row from the vertical scanning circuit 2. Each of the signal line SEL is electrically connected to a gate of the select transistor 105 of each of the pixels 100 that are aligned in the row direction, and serves as a common signal line for these pixels 100. One end of the signal line SEL is connected to the vertical scanning circuit 2, and the signal line SEL is configured to be capable of applying a signal PSEL to the gates of the select transistors 104 of the pixels 100 on the corresponding row from the vertical scanning circuit 2. Each of the signal line Cex is electrically connected to the gate of the additional capacitor select transistor 106 of each of the pixels 100 that are aligned in the row direction, and serves as a common signal line for these pixels 100. One end of the signal line Cex is connected to the vertical scanning circuit 2, and the signal line Cex is configured to be capable of applying a signal PCex to the gates of the additional capacitor select transistors 106 of the pixels 100 on the corresponding row from the vertical scanning circuit 2.

Vertical signal lines 6 that extend in the column direction are arranged in the respective columns of the pixel array. Each of the vertical signal lines 6 is electrically connected to the node PDOUT of each of the pixels 100 that are aligned in the column direction, and serves as a common signal line for these pixels 100. One end of each vertical signal line 6 is connected to the column amplifier unit 3. By this means, the output signals from the pixels 100 can be transferred to the column amplifier unit 3 through the vertical signal lines 6.

As illustrated in FIG. 2, the column amplifier unit 3 includes a current source 7 and a column amplifier 8 in each column. An input node of each of the current source 7 and the column amplifier 8 is electrically connected to the vertical signal line 6. A reference voltage Vref is applied to another input node of the column amplifier 8. An output node of the column amplifier 8 is connected to the signal holding unit 4.

As illustrated in FIG. 2, the signal holding unit includes select switches 9, 10, 11 and 12 and signal holding capacitors 13, 14, 15 and 16 in each column. One main node of each of the select switches 9, 10, 11 and 12 is electrically connected to the column amplifier unit 3 (the output terminal of the column amplifier 8). Another main node of each of the select switches 9, 10, 11 and 12 is electrically connected to one node of the each of the signal holding capacitor 13, 14, 15 and 16, respectively. Another node of each of the signal holding capacitors 13, 14, 15 and 16 is given a fixed potential (for example, ground potential). The select switches 9, 10, 11 and 12 are controlled by signals TS1, TN1, TS2 and TN2 that are output from the vertical scanning circuit 2, respectively.

Next, a method of driving the solid-state imaging device according to the present embodiment will be described using FIG. 1 to FIG. 3.

The vertical scanning circuit 2 controls the signal levels of the signal PTX, the signal PRES, the signal PSEL and the signal PCex that are supplied to the pixel 100 for sequentially reading out signals of a plurality of the pixels 100 within an imaging region 1 in row units. This kind of operation to read out the signals of rows in sequence is referred to as "vertical scanning." As a result of this vertical scanning performed by the vertical scanning circuit 2, photoelectric conversion signals and reference signals generated in the respective pixels 100 are output in row units to the vertical signal lines 6 through the nodes PDOUT.

The column amplifier unit 3 amplifies signals that were output from the vertical signal lines 6, and outputs the amplified signals to the signal holding unit 4. The signal holding unit 4 temporarily holds the signals that were amplified by the column amplifier unit 3. The horizontal transfer unit 5 sequentially transfers, in the horizontal direction, the signals for the respective columns that are held in the signal holding capacitors 13, 14, 15 and 16 of the signal holding unit 4, to read out the signals. By repeatedly performing this series of operations in row units, the information of all the pixels 100 in the imaging region 1 can be read out.

The above described series of readout operations will now be described in more detail using the timing chart in FIG. 3.

At a time before a time t0, the signal PRES, signal PCex, signal PTX, signal PSEL, signal TN1, signal TS1, signal TN2 and signal TS2 are set to low level (hereunder described as "L level") by the vertical scanning circuit 2.

At the time t0, the vertical scanning circuit 2 sets the signal PRES to high level (hereunder described as "H level") to thereby place the reset transistor 103 in an ON state. As a result, the floating diffusion capacitor 107 is electrically connected to a power supply voltage VDD through the reset transistor 103, and the floating diffusion capacitor 107 is reset to a potential that is based on the power supply voltage VDD.

Further, at the same time t0, the vertical scanning circuit 2 sets the signal PCex to H level to thereby place the additional capacitor select transistor 106 in an ON state. As a result, the additional capacitor 108 is electrically connected to the power supply voltage VDD through the additional capacitor select transistor 106 and the reset transistor 103, and the additional capacitor 108 is reset to a potential that is based on the power supply voltage VDD.

Furthermore, at the same time t0, the vertical scanning circuit 2 sets the signal PTX to H level to thereby place the transfer transistor 102 in an ON state. As a result, the photodiode 101 is electrically connected to the power supply voltage VDD through the transfer transistor 102 and the reset transistor 103, and the photodiode 101 is reset to a potential that is based on the power supply voltage VDD.

Next, at a time t1, the vertical scanning circuit sets the signal PRES, signal PCex and signal PTX to L level. As a result, the reset transistor 103, the additional capacitor select transistor 106 and the transfer transistor 102 become an OFF state, and the reset operation with respect to the floating diffusion capacitor 107, the additional capacitor 108 and the photodiode 101 is completed. Further, from the same time t1, an accumulation period, in which signal charges generated by photoelectric conversion are accumulated, starts at the photodiode 101. Note that, the timings of changing the signal levels of the signal PRES, signal PCex, and signal PTX need not necessarily be the same. For example, after the signal levels of the signal PTX and the signal PCex are changed to L level, the signal level of the signal PRES may be changed to L level.

Next, at a time t2, the vertical scanning circuit sets the signal PRES to H level to thereby place the reset transistor 103 in an ON state. As a result, the floating diffusion capacitor 107 is electrically connected to the power supply voltage VDD through the reset transistor 103, and the floating diffusion capacitor 107 is reset to a potential (reset potential) based on the power supply voltage VDD.

Further, at the same time t2, the vertical scanning circuit 2 sets the signal PSEL to H level to thereby place the select transistor 105 in an ON state. As a result, the source follower transistor 104 becomes a state in which the power supply voltage VDD is supplied to the drain and a bias current is supplied to the source from the current source 7 through the vertical signal line 6 and the select transistor 105 to thereby constitute a source follower circuit. Further, the gate of the source follower transistor 104 is electrically connected to the floating diffusion capacitor 107. Accordingly, an output signal of the source follower transistor 104 that is based on the reset potential of the floating diffusion capacitor 107 is output through the select transistor 105 to the vertical signal line 6.

Furthermore, at the same time t2, the vertical scanning circuit 2 sets the signal TN1 to H level to thereby place the select switch 10 in an ON state. As a result, the output signal based on the reset potential of the floating diffusion capacitor 107 output to the vertical signal line 6 is output to the signal holding capacitor 14 through the column amplifier 8.

Next, at a time t3, the vertical scanning circuit sets the signal PRES and the signal TN1 to L level to thereby place the reset transistor 103 and the select switch 10 in an OFF state. As a result, the signal holding capacitor 14 is disconnected from the pixel 100 and the column amplifier unit 3, and the signal holding capacitor 14 becomes a state in which the output signal based on the reset potential of the floating diffusion capacitor 107 is held.

Note that, the timing for driving the reset transistor 103 and the timing for driving the select switch 10 need not necessarily be the same. A configuration may also be adopted in which, after driving the reset transistor 103 to reset the floating diffusion capacitor 107, the select switch 10 is driven and an output signal is output to the signal holding capacitor 14.

Next, at a time t4, the vertical scanning circuit sets the signal PTX to H level to thereby place the transfer transistor 102 in an ON state. As a result, the photodiode 101 and the floating diffusion capacitor 107 are electrically connected through the transfer transistor 102, and the signal charges accumulated in the photodiode 101 are transferred to the floating diffusion capacitor 107. At this time, if the signal charges accumulated in the photodiode 101 are less than a charge amount that the floating diffusion capacitor 107 is capable of holding (saturation charge amount), all the signal charges accumulated in the photodiode 101 are transferred to the floating diffusion capacitor 107. In contrast, if the signal charges accumulated in the photodiode 101 exceed the charge amount that can be held by the floating diffusion capacitor 107, some of the signal charges are left in the photodiode 101.

At the time t4 the select transistor 105 remains in an ON state, and the source follower transistor 104 constitutes a source follower circuit. Further, the gate of the source follower transistor 104 is electrically connected to the floating diffusion capacitor 107. Consequently, an output signal based on a potential that is in accordance with the amount of signal charges (hereunder, referred to as "output signal based on the signal charges") transferred to the floating diffusion capacitor 107 is output through the select transistor 105 to the vertical signal line 6.

Furthermore, at the same time t4, the vertical scanning circuit 2 sets the signal TS1 to H level to thereby place the select switch 9 in an ON state. As a result, the output signal based on the signal charges transferred to the floating diffusion capacitor 107 output to the vertical signal line 6 is output to the signal holding capacitor 13 through the column amplifier 8.

Subsequently, at a time t5, the vertical scanning circuit 2 sets the signal PTX and the signal TS1 to L level to thereby place the transfer transistor 102 and the select switch 9 in an OFF state. As a result, the signal holding capacitor 13 is disconnected from the pixel 100 and the column amplifier unit 3, and the signal holding capacitor 13 becomes a state in which the output signal based on the signal charges transferred to the floating diffusion capacitor 107 is held.

Note that, the timing for driving the transfer transistor 102 and the timing for driving the select switch 9 need not necessarily be the same. A configuration may also be adopted in which, after driving the transfer transistor 102 to transfer the signal charges to the floating diffusion capacitor 107, the select switch 9 is driven and an output signal is output to the signal holding capacitor 13.

Next, at a time t8, the vertical scanning circuit sets the signal PCex to H level to thereby place the additional capacitor select transistor 106 in an ON state. As a result, a combined capacitor in which the floating diffusion capacitor 107 and the additional capacitor 108 are parallelly connected is electrically connected at the FD node. As a result of the combined capacitor of the floating diffusion capacitor 107 and the additional capacitor 108 being electrically connected at the FD node, it is possible to hold more signal charges.

Further, at the same time t8, the vertical scanning circuit 2 sets the signal PRES to H level to thereby place the reset transistor 103 in an ON state. As a result, the combined capacitor in which the floating diffusion capacitor 107 and the additional capacitor 108 are connected in parallel is reset to a potential (reset potential) that is based on the power supply voltage VDD.

At the time t8, the select transistor 105 remains in an ON state, and the source follower transistor 104 constitutes a source follower circuit. Further, the gate of the source follower transistor 104 is electrically connected to the combined capacitor of the floating diffusion capacitor 107 and the additional capacitor 108. Therefore, an output signal based on the reset potential of the combined capacitor of the floating diffusion capacitor 107 and the additional capacitor 108 is output through the select transistor 105 to the vertical signal line 6.

At the same time t8, the vertical scanning circuit 2 sets the signal TN2 to H level to thereby place the select switch 12 in an ON state. As a result, the output signal based on the reset potential of the combined capacitor of the floating diffusion capacitor 107 and the additional capacitor 108 output to the vertical signal line 6 is output to the signal holding capacitor 16 through the column amplifier 8.

Next, at a time t9, the vertical scanning circuit sets the signal PRES and the signal TN2 to L level to thereby place the reset transistor 103 and the select switch 12 in an OFF state. As a result, the signal holding capacitor 16 is disconnected from the pixel 100 and the column amplifier unit 3, and the signal holding capacitor 16 becomes a state in which the output signal based on the reset potential of the combined capacitor of the floating diffusion capacitor 107 and the additional capacitor 108 is held.

Note that, the timing for driving the reset transistor 103 and the additional capacitor select transistor 106 and the timing for driving the select switch 12 need not necessarily be the same. A configuration may also be adopted in which, after driving the reset transistor 103 and the additional capacitor select transistor 106 to reset the floating diffusion capacitor 107 and the additional capacitor 108, the select switch 12 is driven and an output signal is output to the signal holding capacitor 16.

Subsequently, at a time t10, the vertical scanning circuit 2 sets the signal PTX to H level to thereby place the transfer transistor 102 in an ON state. As a result, the photodiode 101 and the combined capacitor of the floating diffusion capacitor 107 and the additional capacitor 108 are electrically connected through the transfer transistor 102. The signal charge that remained in the photodiode 101 is then transferred to the combined capacitor of the floating diffusion capacitor 107 and the additional capacitor 108.

At the time t10 the select transistor 105 remains in an ON state, and the source follower transistor 104 constitutes a source follower circuit. Further, the gate of the source follower transistor 104 is electrically connected to the combined capacitor of the floating diffusion capacitor 107 and the additional capacitor 108. Consequently, an output signal based on a potential that is in accordance with amount of signal charges (hereunder, referred to as "output signal based on the signal charges") transferred to the combined capacitor of the floating diffusion capacitor 107 and the additional capacitor 108 is output through the select transistor 105 to the vertical signal line 6.

Further, at the same time t10, the vertical scanning circuit 2 sets the signal TS2 to H level to thereby place the select switch 11 in an ON state. As a result, the output signal based on the signal charges transferred to the combined capacitor of the floating diffusion capacitor 107 and the additional capacitor 108 is output to the signal holding capacitor 15 through the column amplifier 8.

Next, at a time t11, the vertical scanning circuit 2 sets the signal PTX and the signal TS2 to L level to thereby place the transfer transistor 102 and the select switch 11 in an OFF state. As a result, the signal holding capacitor 15 is disconnected from the pixel 100 and the column amplifier unit 3, and the signal holding capacitor becomes a state in which the output signal based on the signal charges transferred to the combined capacitor of the floating diffusion capacitor 107 and the additional capacitor 108 is held.

Note that, the timing for driving the transfer transistor 102 and the timing for driving the select switch 11 need not necessarily be the same. A configuration may also be adopted in which, after driving the transfer transistor 102 to transfer the signal charges to the combined capacitor of the floating diffusion capacitor 107 and the additional capacitor 108, the select switch 11 is driven and an output signal is output to the signal holding capacitor 15.

By dividing the operation to read out the signal charges accumulated in the photodiode 101 into two separate operations in this manner, all the signal charges accumulated in the photodiode 101 can be output as an usable signal. In the case of a configuration in which a charge amount that can be held by the combined capacitor of the floating diffusion capacitor 107 and the additional capacitor 108 becomes less than the charges remaining in the photodiode, a configuration can be adopted in which a signal holding capacitors are further added, and resetting of the capacitors and transfer of signals can be repeatedly performed three times or more.

Thereafter, at the horizontal transfer unit 5, output signals can be obtained from each of the pixels 100 by reading out the signals held by the signal holding capacitors 13, 14, 15 and 16, and outputting sequentially, in the horizontal direction, the signals of the respective columns that were read out.

The signal held in the signal holding capacitor as a result of the above described series of readout operations is a reference signal (first pixel signal) that is in accordance with noise charges accumulated in the floating diffusion capacitor 107 after the floating diffusion capacitor 107 is reset prior to transferring the charges. Further, the signal held in the signal holding capacitor 13 is a photoelectric conversion signal (second pixel signal) that is in accordance with charges obtained by adding the charges transferred from the photodiode 101 to the floating diffusion capacitor 107. Therefore, by subtracting the signal level of the first pixel signal from the signal level of the second pixel signal, that is, by performing correlated double sampling, an output signal (third pixel signal) from which an inherent noise component of the floating diffusion capacitor 107 has been removed is obtained.

Likewise, the signal held in the signal holding capacitor 16 is a reference signal (fourth pixel signal) that is in accordance with noise charges accumulated in the floating diffusion capacitor 107 and the additional capacitor 108 after the combined capacitor of the floating diffusion capacitor 107 and the additional capacitor 108 are reset. Further, the signal held in the signal holding capacitor 15 is a photoelectric conversion signal (fifth pixel signal) that is in accordance with charges obtained by adding the charges transferred from the photodiode 101 to the combined capacitor of the floating diffusion capacitor 107 and the additional capacitor 108. Therefore, by subtracting the signal level of the fourth pixel signal from the signal level of the fifth pixel signal, that is, by performing correlated double sampling, an output signal (sixth pixel signal) from which an inherent noise component of the combined capacitor of the floating diffusion capacitor 107 and the additional capacitor 108 has been removed is obtained.

FIG. 4 is a graph illustrating the dependence with respect to an optical input amount of the respective voltages (third and sixth pixel signals) obtained by subtracting the voltages (first and fourth pixel signals) based on the reset potentials from the voltages (second and fifth pixel signals) based on the signal charges. In FIG. 4, reference character L1 denotes an optical input amount that corresponds to a saturation charge amount of the floating diffusion capacitor 107. The region up to the optical input amount L1 corresponds to the characteristic of the third pixel signal, and the region exceeding the optical input amount L1 corresponds to the characteristic of the sixth pixel signal.

In a case where the optical input amount is less than or equal to L1, since all the charges accumulated in the photodiode 101 are transferred to the floating diffusion capacitor 107 in the step from the time t4 to the time t5, the output voltage is a value that is based on the accumulated charges in the floating diffusion capacitor 107. The output voltage increases together with an increase in the optical input amount until the optical input amount reaches the amount denoted by L1. When the optical input amount exceeds L1, since a charge amount that is generated at the photodiode 101 exceeds the saturation charge amount of the floating diffusion capacitor 107, the output voltage does not increase to an amount that is greater than the output voltage in the case where the optical input amount is the amount denoted by L1.

Further, in the region where the optical input amount is less than or equal to L1, all the charges accumulated in the photodiode 101 are transferred to the floating diffusion capacitor 107 in the step from the time t4 to the time t5. Therefore, the amount of signal charges that are transferred to the combined capacitor of the floating diffusion capacitor 107 and the additional capacitor 108 in the step from the time t10 to the time t11 is zero. As a result, an output voltage that is based on the accumulated charges in the combined capacitor of the floating diffusion capacitor 107 and the additional capacitor 108 is zero.

When the optical input amount exceeds L1, some signal charges that were not transferred to the floating diffusion capacitor 107 in the step from the time t4 to the time t5 are transferred to the combined capacitor of the floating diffusion capacitor 107 and the additional capacitor 108 in the step from the time t10 to the time t11. Therefore, the output voltage is a value that is based on the accumulated charges in the combined capacitor of the floating diffusion capacitor 107 and the additional capacitor 108. This output voltage increases together with an increase in the optical input amount until reaching an optical input amount that corresponds to a saturation charge amount of the combined capacitor of the floating diffusion capacitor 107 and the additional capacitor 108 or the photodiode 101.

In this case, since the voltage value is inversely proportional to the capacitance value (i.e., V=Q/C), the amount of change in the output voltage with respect to the optical input amount is greater in the output signal from only the floating diffusion capacitor 107 compared to the output signal from the combined capacitor of the floating diffusion capacitor 107 and the additional capacitor 108. That is, the slope of the output voltage with respect to the optical input amount is greater in the case of the output signal from only the floating diffusion capacitor 107 compared to the case of the output signal from the combined capacitor of the floating diffusion capacitor 107 and the additional capacitor 108 (see FIG. 4).

When calculating output signals from the respective pixels 100 that include the third and sixth pixel signals from which the inherent noise components of the capacitors are removed, the relevant signals are converted into output signals in accordance with the optical input amount by taking into account the foregoing two output voltage characteristics having different slopes that are obtained from the different capacitors. That is, when the optical input amount is less than L1, a value of the output signal (third pixel signal) that is based on the accumulated charge amount of the floating diffusion capacitor 107 is used as it is for the output signal. When the optical input amount is equal to or greater than L1, a value that is obtained by adding a value obtained by multiplying the value of the output signal based on the accumulated charge amount of the combined capacitor of the floating diffusion capacitor 107 and the additional capacitor 108 by a coefficient K to the value of the output signal based on the accumulated charge amount of the floating diffusion capacitor 107 for the optical input amount L1 is used for the output signal. Here, the coefficient K is a parameter for performing an appropriate adjustment so that the signal output after conversion becomes linear with respect to the optical input amount, and fundamentally is a value that is close to the capacitance ratio between the floating diffusion capacitor 107 and the combined capacitor. This conversion processing is equivalent to processing for, so to speak, normalizing an output voltage using a capacitance value.

FIG. 5 is one example of a graph illustrating the dependence with respect to an optical input amount of an output signal obtained by synthesizing using the above described conversion procedures. The solid line represents a signal component, and the dashed line represents a noise component. Note that FIG. 5 is a double logarithmic graph in which the vertical axis and the horizontal axis represent arbitrary units.

In FIG. 5, in a region in which the optical input amount is less than L1, all the charges accumulated in the photodiode 101 are transferred to the floating diffusion capacitor 107. An output signal for this region is a signal that is based on the accumulated charge amount in the floating diffusion capacitor 107. In a region in which optical input amount is greater than or equal to L1 and less than or equal to L2, the charges accumulated in the photodiode 101 are transferred to the floating diffusion capacitor 107 and to the combined capacitor of the floating diffusion capacitor 107 and the additional capacitor 108. An output signal for this region is a combined signal of a value that is based on the accumulated charge amount in the floating diffusion capacitor 107 and a value that is based on the accumulated charge amount in the combined capacitor of the floating diffusion capacitor 107 and the additional capacitor 108. Note that a region in which the optical input amount exceeds L2 is a region in which the photodiode 101 or the combined capacitor of the floating diffusion capacitor 107 and the additional capacitor 108 could not accumulate all the signal charges and consequently the signal charges overflowed, and the correlation between the optical input amount and the signal output and noise output is not obtained in this region.

By switching the capacitors to which to transfer the signal charges in accordance with the optical input amount in this manner, it is possible to use the signal charges accumulated in the photodiode 101 without leaving any signal charges in the photodiode 101. It is thus possible to obtain a signal output with respect to a wide range of optical input amounts, and imaging with a wide dynamic range can be performed.

Further, by using the floating diffusion capacitor 107 and the additional capacitor 108, there is also the advantageous effect that the capacitance value of the floating diffusion capacitor 107 can be reduced and the noise level on a low illuminance side can be lowered.

Noise components that are superimposed on the output signals are broadly divided into a random noise component and a photo-shot noise component. The principal cause of a random noise component is voltage noise of the source follower transistor 104 or the column amplifier 8, and the random noise component has a characteristic of being an approximately constant value regardless of the optical input. Further, with respect to the random noise component, a value that is converted into a number of electrons within a pixel unit varies depending on the capacitance value of the floating diffusion capacitor 107 or the combined capacitor of the floating diffusion capacitor 107 and the additional capacitor 108 or the like. That is, although the random noise component is an approximately constant voltage, the signal output voltage decreases relatively when the capacitance value is large, and hence the ratio of the noise output with respect to the signal output and electron number conversion, that is, the S/N ratio, decreases.

In this respect, in the solid-state imaging device according to the present embodiment, in a region on the low illuminance side, a signal output is obtained using only the floating diffusion capacitor 107. Therefore, the S/N ratio in the low illuminance region can be raised by making the capacitance value of the floating diffusion capacitor 107 sufficiently small.

On the other hand, in a case where the optical input amount is equal to or greater than L1, since the combined capacitor of the floating diffusion capacitor 107 and the additional capacitor 108 is used, a random noise component increases with respect to the electron number conversion. However, in a state in which there is sufficient optical input, the influence of a phot-shot noise component becomes greater than the random noise component. It is known that a phot-shot noise component is proportional to the square root of the number of signal charges accumulated in the photodiode 101. Therefore, in a state in which there is sufficient optical input, since the photo-shot noise component accounts for the greater part of the noise component, it is difficult for a problem to arise even if the random noise component increases to a certain extent.

In consideration of the above point, as one example, the optical input amount L1 can be defined as an optical input amount at which a photo-shot noise component is more dominant than a random noise component. In other words, it is desirable to set the capacitance value of the floating diffusion capacitor 107 to a value that is equal to or less than a capacitance value that corresponds to an optical input amount at which a photo-shot noise component becomes more dominant than a random noise component. Note that, since the breakdown of noise components varies depending on the structure of the solid-state imaging device and the driving voltage and the like, it is desirable to appropriately select the optical input amount L1 in accordance with the particular structure and driving conditions and the like of the solid-state imaging device. The capacitance value of the floating diffusion capacitor 107 can be appropriately decided after taking the optical input amount L1 into consideration.

According to the solid-state imaging device of the present embodiment, output signals are obtained from the charges accumulated in the photodiode 101 by separately using the floating diffusion capacitor 107 that has a small capacitance and the combined capacitor that has a larger capacitance. Thus, imaging with a wide dynamic range can be performed while securing the S/N ratio from a region in which the optical input is low to a region in which the optical input is high. As described in the foregoing, the dynamic range can be further extended by adding another signal holding capacitor and transferring signals three or more times. In addition, it is possible to extend the dynamic range still further by adding a larger additional capacitor than the additional capacitor 108 and an additional capacitor select transistor, and performing driving in a similar manner.

Thus, according to the present embodiment, imaging with a wide dynamic range can be performed while securing the S/N ratio from a region in which the optical input is low to a region in which the optical input is high.

Second Embodiment

Figure 6:
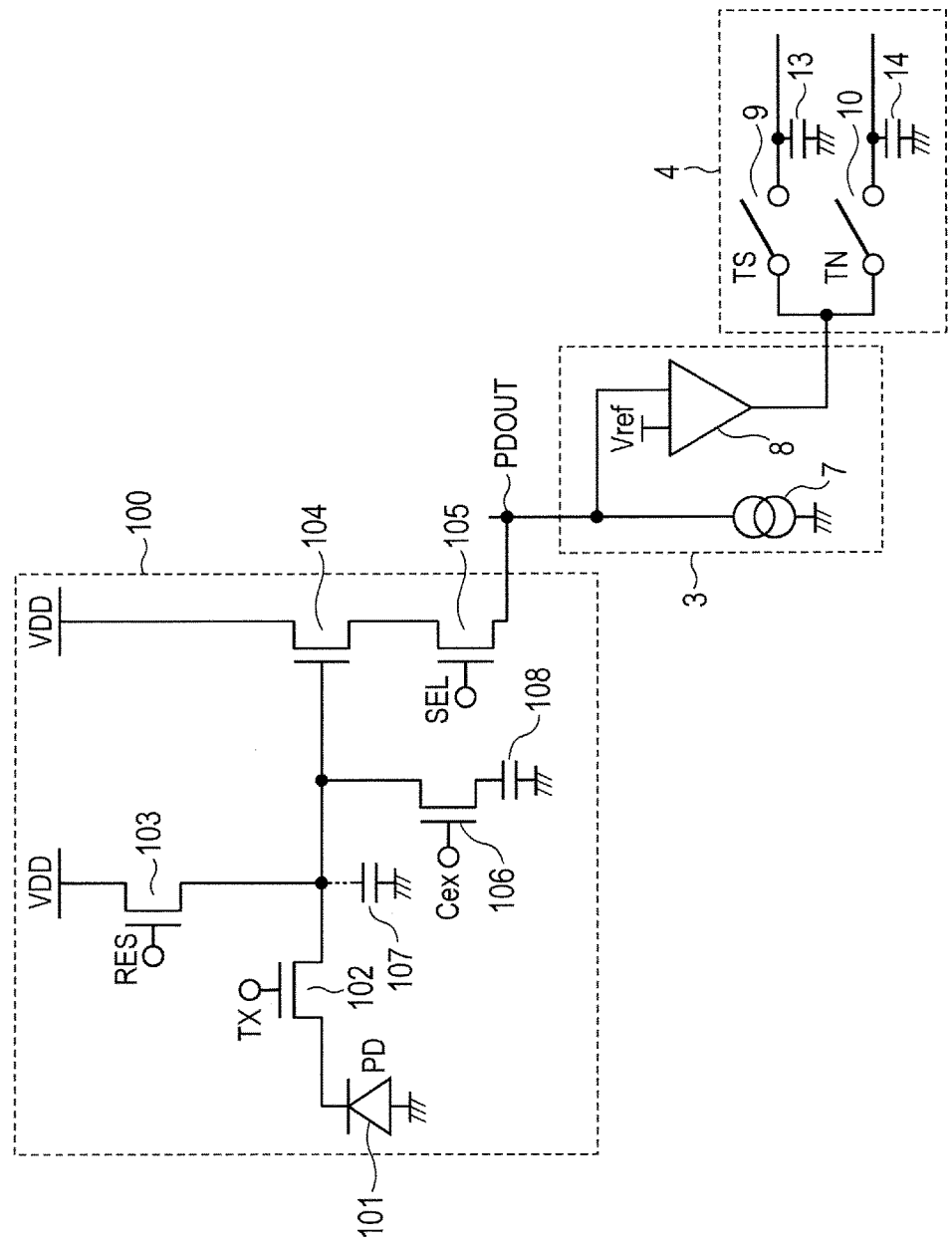
FIG. 6 is a circuit diagram illustrating one example of the configuration of a solid-state imaging device according to a second embodiment of the present invention.
Figure 7:
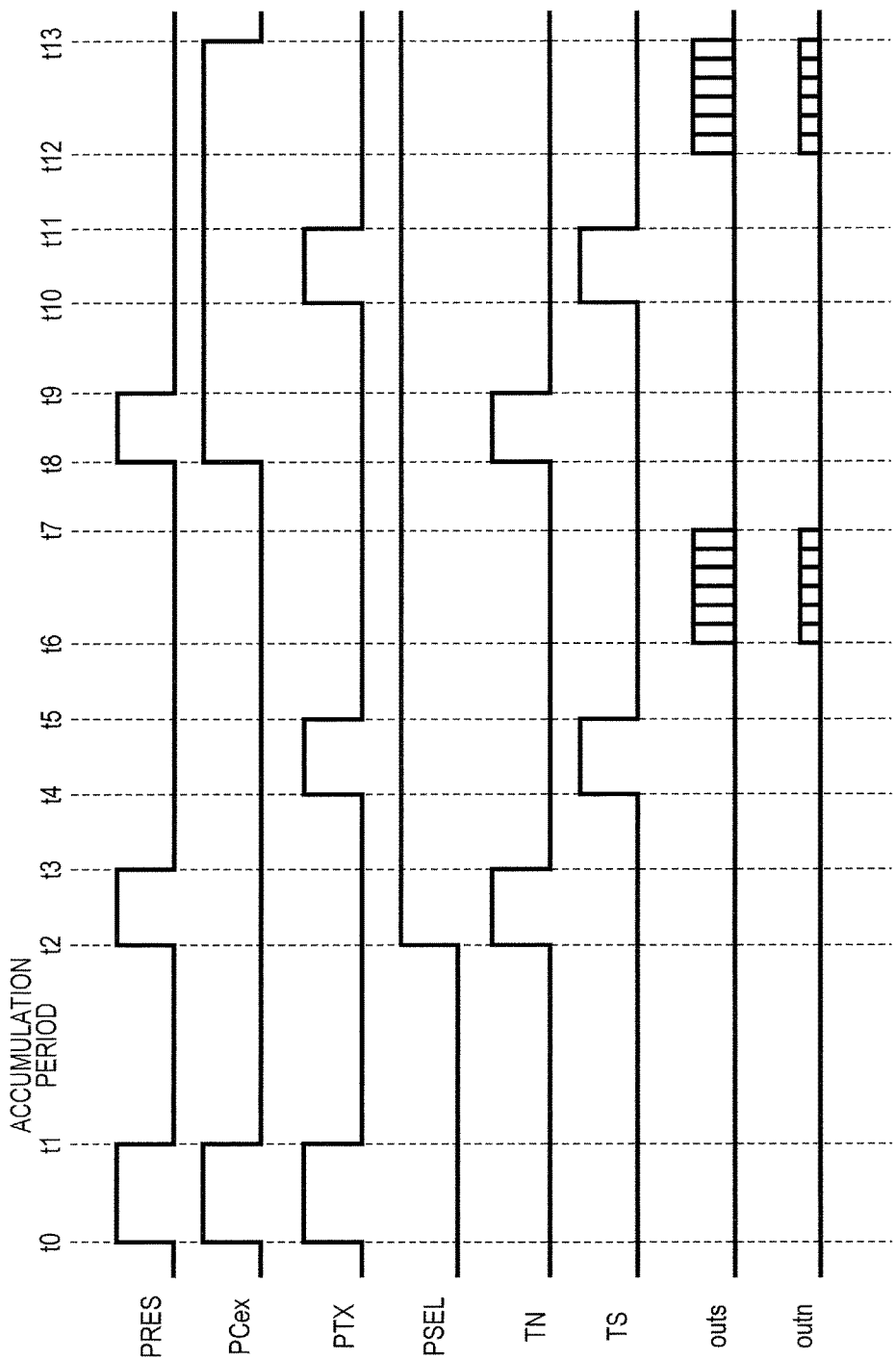
FIG. 7 is a timing chart illustrating one example of a method of driving the solid-state imaging device according to the second embodiment of the present invention.

A solid-state imaging device and a method of driving the same according to a second embodiment of the present invention will be described with reference to FIG. 6 and FIG. 7. In FIG. 6 and FIG. 7, constituent elements that are the same as in the solid-state imaging device and the method of driving the same according to the first embodiment illustrated in FIG. 1 to FIG. 5 are denoted by the same reference characters as in FIG. 1 to FIG. 5, and a description of those constituent elements is omitted or abbreviated hereunder.

FIG. 6 is a circuit diagram illustrating an example of the configuration of the solid-state imaging device according to the present embodiment. FIG. 7 is a timing chart illustrating an example of a method of driving the solid-state imaging device according to the present embodiment.

In the solid-state imaging device according to the first embodiment the signal holding unit 4 is constituted by the four select switches 9, 10, 11 and 12 and the four signal holding capacitors 13, 14, 15 and 16. As illustrated in FIG. 6, the solid-state imaging device according to the present embodiment differs from the solid-state imaging device of the first embodiment in the respect that the signal holding unit 4 is constituted by two select switches 9 and 10 and two signal holding capacitors 13 and 14. By decreasing the number of select switches to the two select switches 9 and 10 and the number of signal holding capacitors to the two signal holding capacitors 13 and 14, the number of interconnections and the circuit area of the horizontal transfer unit 5 that transfers the signals held in the signal holding unit 4 and signal holding capacitors 13 and 14 can be decreased, and thus the chip area can be reduced.

In the solid-state imaging device according to the present embodiment, a reduction in the circuit area is enabled by outputting output signals based on charges of the floating diffusion capacitor 107 and outputting signals based on charges of the combined capacitor of the floating diffusion capacitor 107 and the additional capacitor 108 at separate timings to the horizontal transfer unit 5.

That is, as illustrated in FIG. 7, a signal based on signal charges and a signal based on a reset potential of the floating diffusion capacitor 107 are output to input nodes "outs" and "outn" of the horizontal transfer unit 5, respectively, during a period from a time t6 to a time t7 after being held in the signal holding capacitors 13 and 14. Further, a signal based on signal charges and a signal based on a reset potential of the combined capacitor of the floating diffusion capacitor 107 and the additional capacitor 108 are output to the input nodes "outs" and "outn" of the horizontal transfer unit 5, respectively, during a period from a time t12 to a time t13 after being held in the signal holding capacitors 13 and 14.

By staggering the respective timings at which to output signals based on charges of the floating diffusion capacitor 107 to the horizontal transfer unit 5 and at which to output signals based on charges of the combined capacitor to the horizontal transfer unit 5, these signals can be held using the same signal holding capacitors 13 and 14. It is thereby possible to decrease the number of interconnections and the circuit area of the horizontal transfer unit 5, and thus reduce the chip area.

Thus, according to the present embodiment, in addition to the advantageous effects of the first embodiment, the peripheral circuit configuration can be simplified and the chip area can be reduced.

Third Embodiment

Figure 8:
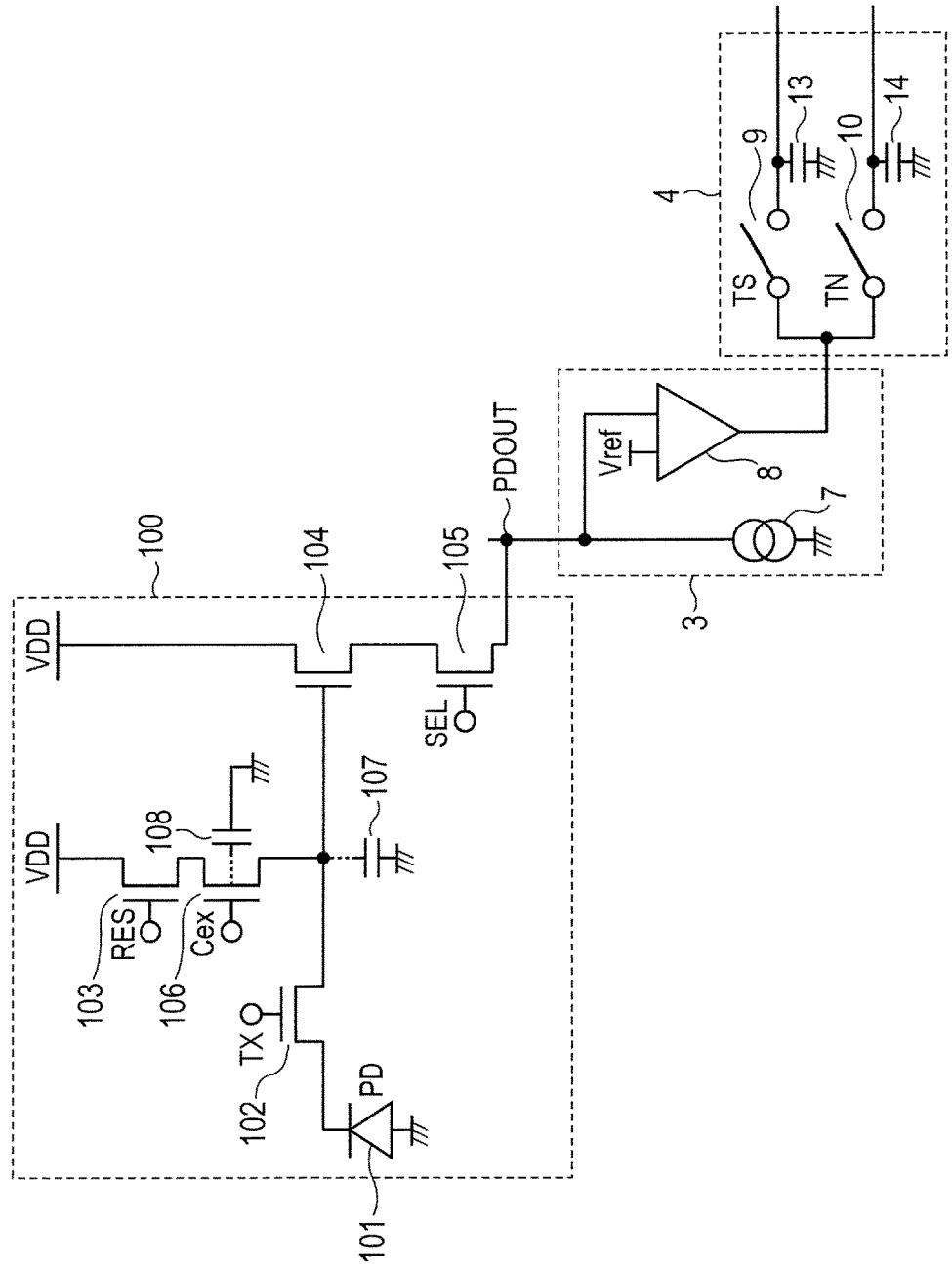
FIG. 8 is a circuit diagram illustrating one example of the configuration of a solid-state imaging device according to a third embodiment of the present invention.
Figure 9:
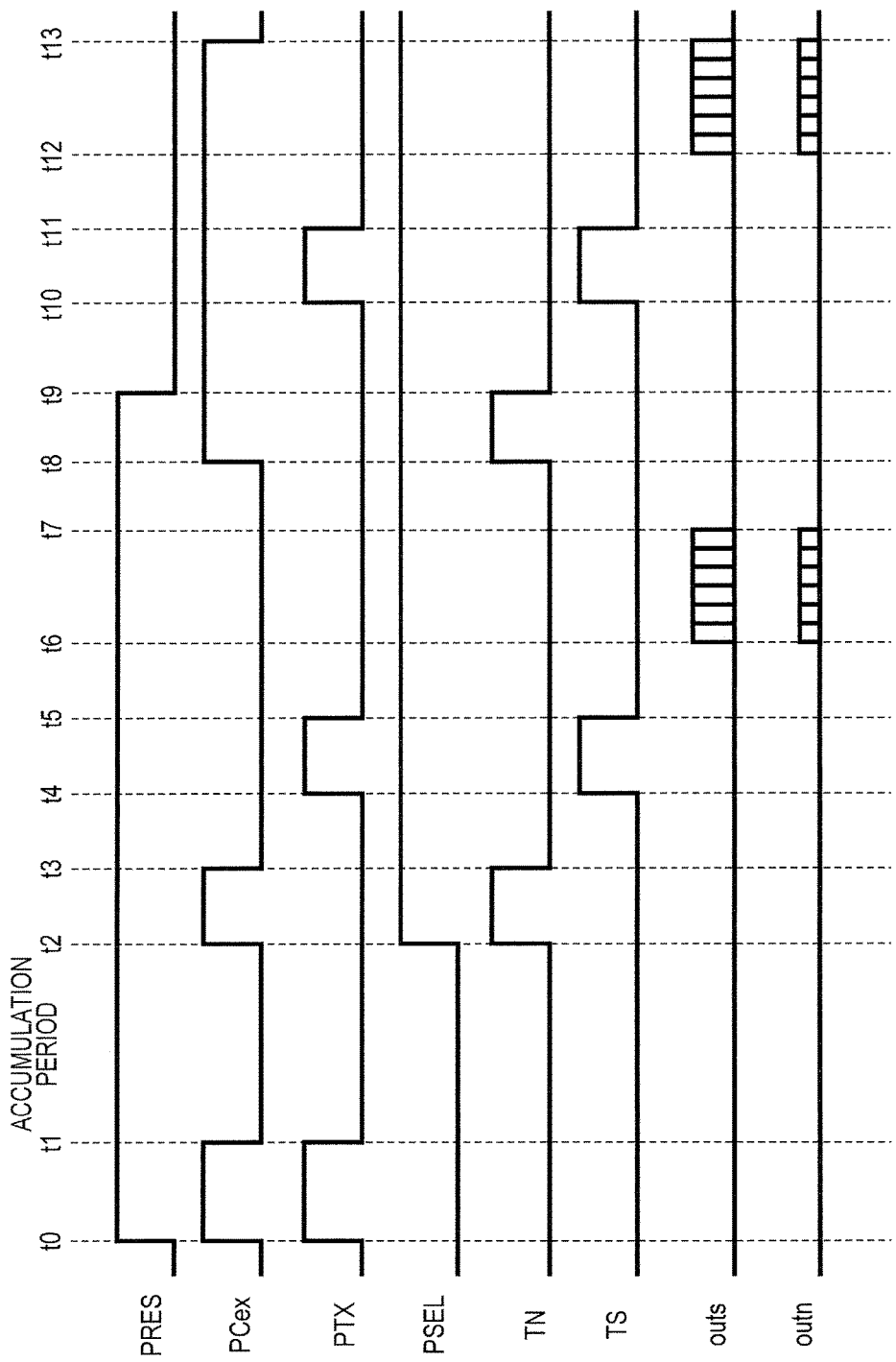
FIG. 9 is a timing chart illustrating one example of a method of driving the solid-state imaging device according to the third embodiment of the present invention.

A solid-state imaging device and a method of driving the same according to a third embodiment of the present invention will be described with reference to FIG. 8 and FIG. 9. In FIG. 8 and FIG. 9, constituent elements that are the same as in the solid-state imaging device and the method of driving the same according to the first and second embodiments illustrated in FIG. 1 to FIG. 7 are denoted by the same reference characters as in FIG. 1 to FIG. 7, and a description of those constituent elements is omitted or abbreviated hereunder.

FIG. 8 is a circuit diagram illustrating an example of the configuration of the solid-state imaging device according to the present embodiment. FIG. 9 is a timing chart illustrating an example of a method of driving the solid-state imaging device according to the present embodiment.

As illustrated in FIG. 8, in the solid-state imaging device according to the present embodiment, the additional capacitor select transistor 106 and the additional capacitor 108 are arranged differently in comparison to the configuration of the solid-state imaging device according to the second embodiment illustrated in FIG. 6. That is, in the solid-state imaging device according to the present embodiment, the additional capacitor select transistor 106 is connected between the source of the reset transistor 103 and the FD node. A capacitor that is formed at underneath the gate of the additional capacitor select transistor 106 is used as the additional capacitor 108. That is, when using the additional capacitor 108, a signal PCex at H level is applied to the gate of the additional capacitor select transistor 106 to place the additional capacitor select transistor 106 in an ON state. Thus, the capacitor (additional capacitor 108) underneath the gate can be connected in parallel to the floating diffusion capacitor 107 to form a combined capacitor.

When using the additional capacitor 108, resetting of the additional capacitor 108 is performed by using the reset transistor 103. On the other hand, when the additional capacitor 108 is not used, resetting of the photodiode 101 and the floating diffusion capacitor 107 is performed using the additional capacitor select transistor 106. At such time, the signal PRES that is applied to the gate of the reset transistor 103 is fixed at H level to keep the reset transistor 103 in an ON state.

The solid-state imaging device according to the present embodiment can be driven, for example, in accordance with the timing chart illustrated in FIG. 9. A first respect in which the driving method of the present embodiment differs from the driving method of the second embodiment is that the signal PRES is fixed at H level during the period from the time t0 to the time t9. A second respect in which the driving method of the present embodiment differs from the driving method of the second embodiment is that the signal PCex is set to H level during the period from the time t2 to the time t3.

In the solid-state imaging device according to the present embodiment, the additional capacitor select transistor 106 is connected between the reset transistor 103 and the FD node. Consequently, when resetting the photodiode 101, the floating diffusion capacitor 107 and the additional capacitor 108, these two transistors are placed in an ON state. Accordingly, during the period in which the signal PRES is fixed at H level, resetting of the photodiode 101, the floating diffusion capacitor 107 and the additional capacitor 108 can be controlled by means of the signal PCex that is applied to the additional capacitor select transistor 106.

Further, by setting the signal PCex to H level at the time t8 and setting the signal PRES to L level at the time t9, the signals can be converted using the combined capacitor of the floating diffusion capacitor 107 and the additional capacitor 108.

Thus, according to the present embodiment, since the region underneath the gate of the additional capacitor select transistor 106 is used as the additional capacitor 108, a redundant source/drain region need not be created in the floating diffusion capacitor 107. By this means, the capacitance value of the floating diffusion capacitor 107 can be decreased and reset noise can be reduced.

Note that, although in the above described example the signal PRES is fixed at H level from the time t0 to the time t9, a configuration may also be adopted so as to set the signal PRES to H level in the respective reset periods (time t0 to t1, time t2 to t3, and time t8 to t9), similarly to the signal PCex.

Further, although in the present embodiment an example has been described in which a configuration in which the additional capacitor select transistor 106 is provided between the reset transistor 103 and the FD node is applied to the solid-state imaging device of the second embodiment, the configuration in which the additional capacitor select transistor 106 is provided between the reset transistor 103 and the FD node may also applied to the solid-state imaging device of the first embodiment.

Thus, according to the present embodiment, in addition to the advantageous effects of the first and second embodiments, the capacitance value of the floating diffusion capacitor can be decreased and the reset noise can be reduced.

Fourth Embodiment

Figure 10:
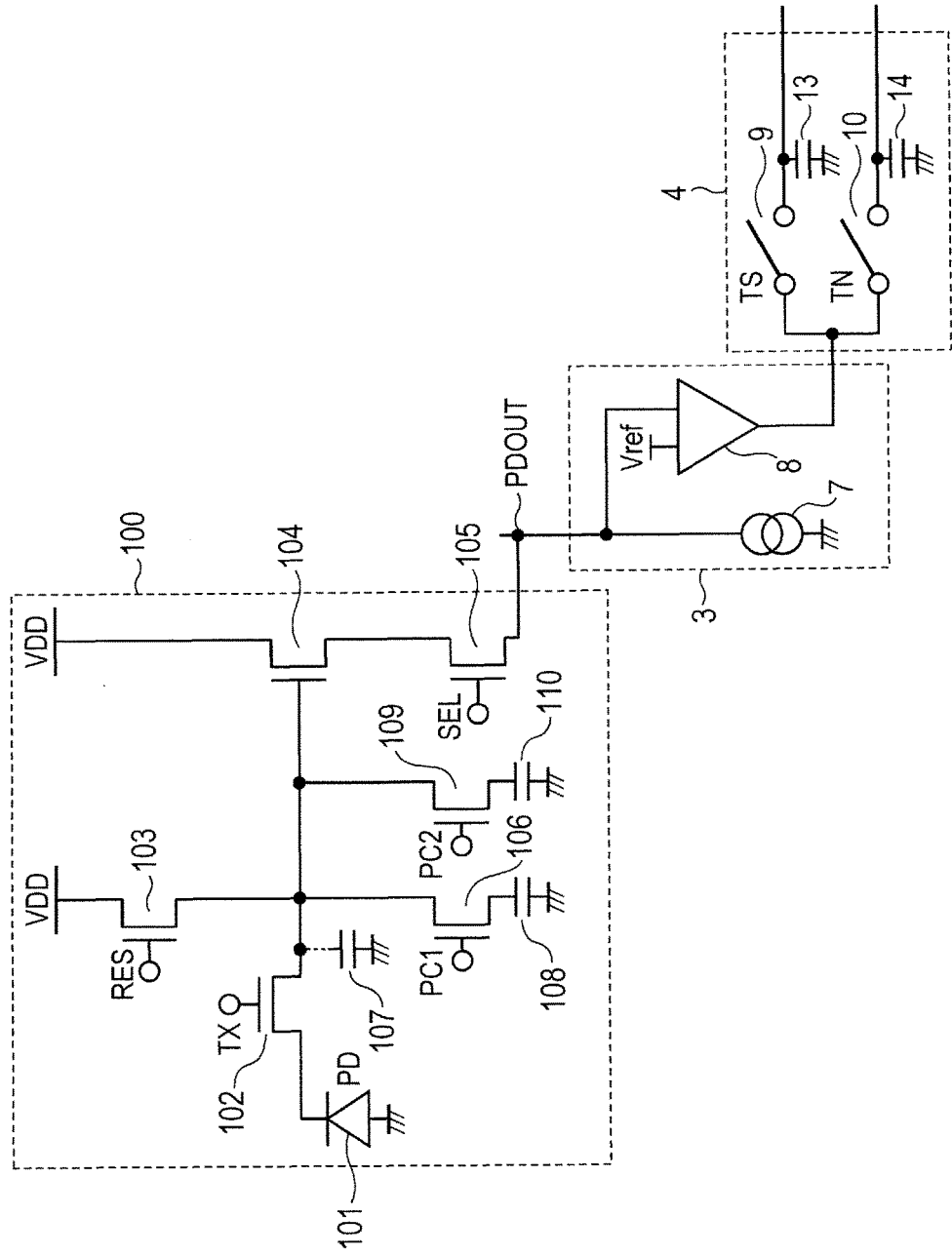
FIG. 10 is a circuit diagram illustrating one example of the configuration of a solid-state imaging device according to a fourth embodiment of the present invention.
Figure 11:
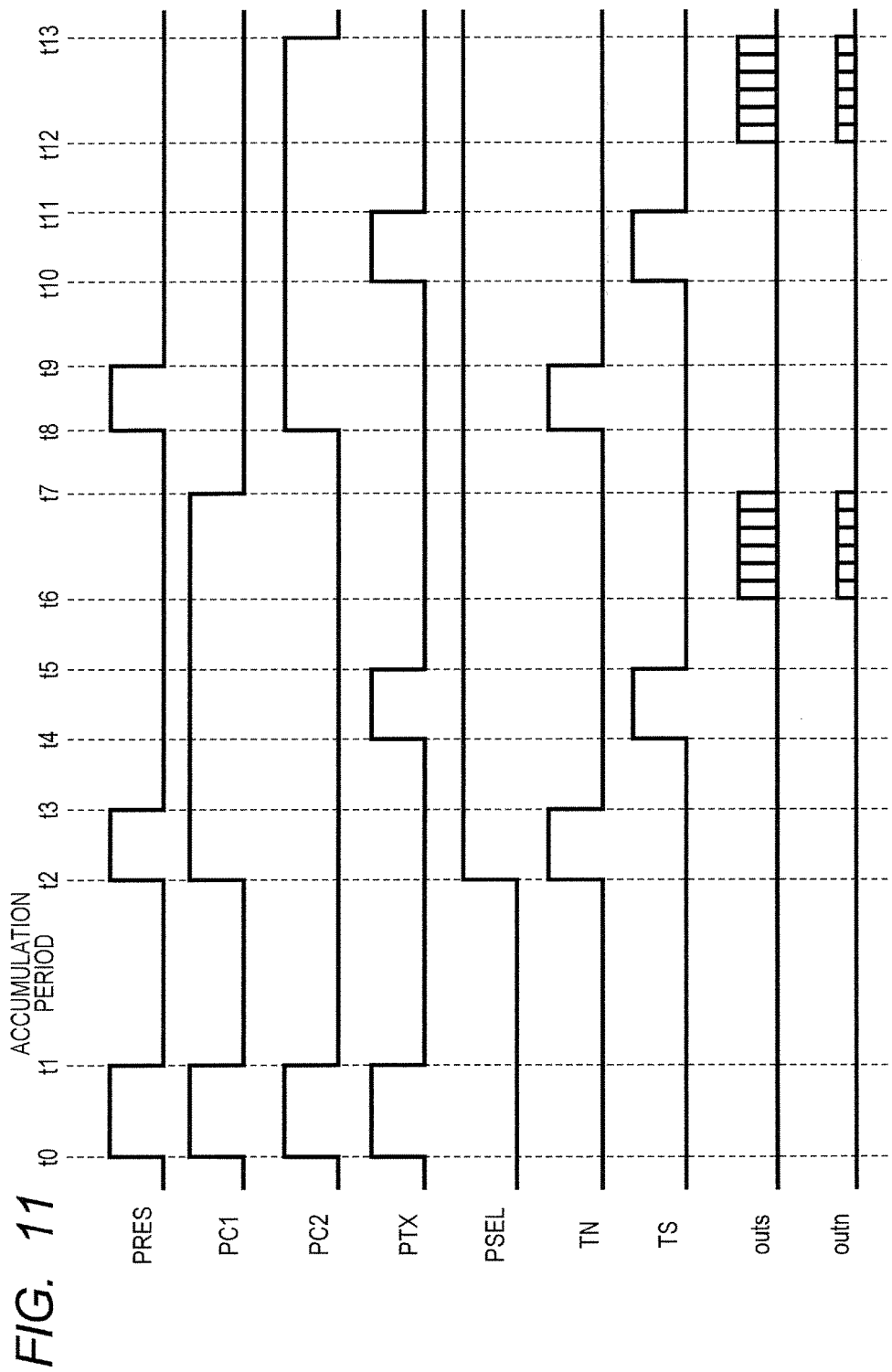
FIG. 11 is a timing chart illustrating one example of a method of driving the solid-state imaging device according to the fourth embodiment of the present invention.

A solid-state imaging device and a method of driving the same according to a fourth embodiment of the present invention will be described with reference to FIG. and FIG. 11. In FIG. 10 and FIG. 11, constituent elements that are the same as in the solid-state imaging device and the method of driving the same according to each of the first to third embodiments illustrated in FIG. 1 to FIG. 9 are denoted by the same reference characters as in FIG. 1 to FIG. 9, and a description of those constituent elements is omitted or abbreviated hereunder.

FIG. 10 is a circuit diagram illustrating an example of the configuration of the solid-state imaging device according to the present embodiment. FIG. 11 is a timing chart illustrating an example of a method of driving the solid-state imaging device according to the present embodiment.

As illustrated in FIG. 10, in the solid-state imaging device according to the present embodiment, in addition to the floating diffusion capacitor 107, an additional capacitor 108 and an additional capacitor 110, that are connected to the FD node, are provided. The additional capacitor 108 is electrically connected to the FD node through the additional capacitor select transistor 106, and the additional capacitor 110 is electrically connected to the FD node through the additional capacitor select transistor 109. The gate of the additional capacitor select transistor 106 is electrically connected to the vertical scanning circuit 2 through an unillustrated signal line C1, and a signal PC1 can be applied thereto from the vertical scanning circuit 2. The gate of the additional capacitor select transistor 109 is electrically connected to the vertical scanning circuit 2 through an unillustrated signal line C2, and a signal PC2 can be applied thereto from the vertical scanning circuit 2. By using the additional capacitor 108 and the additional capacitor 110, the capacitance value of a capacitance that transfers signal charges can be appropriately set.

The solid-state imaging device according to the present embodiment can be driven, for example, in accordance with the timing chart illustrated in FIG. 11. The driving method of the present embodiment differs from the driving method of the second embodiment in the respect that the signal PC1 is set to H level during the period from the time t2 to the time t7, and that the signal PC2 is set to H level during the period from the time t8 to the time t13. That is, according to the driving method of the present embodiment, the additional capacitor 108 and the additional capacitor 110 are selected by the signal PC1 and the signal PC2, respectively.

That is, although in the embodiments described above the floating diffusion capacitor 107 is used when reading out the first and second pixel signals (time t2 to t7), in the present embodiment the combined capacitor of the floating diffusion capacitor 107 and the additional capacitor 108 is used. Further, although in the embodiments described above the combined capacitor of the floating diffusion capacitor 107 and the additional capacitor 108 is used when reading out the fourth and fifth pixel signals (time t8 to t13), in the present embodiment the combined capacitor of the floating diffusion capacitor 107 and the additional capacitance 110 is used.

By providing the plurality of additional capacitors 108 and 110 which can be selectably connected or not connected to the FD node, a variety of values can be selected with respect to a capacitance value of the FD node that transfers signal charges of the photodiode 101, including a case in which a plurality of capacitors is arbitrarily combined. By this means, solid-state imaging devices having the same configuration can be used in different ways in accordance with the purpose of use.

Thus, according to the present embodiment, in addition to the advantageous effects of the first and second embodiments, the degree of freedom in setting a capacitance value can be increased.

Note that, although in the present embodiment an example is described in which a configuration in which two additional capacitors which can be selectably connected or not connected to the FD node are provided is applied to the solid-state imaging device of the second embodiment, the above described configuration of the present embodiment may also be applied to the solid-state imaging device of the first embodiment.

Fifth Embodiment

Figure 12:
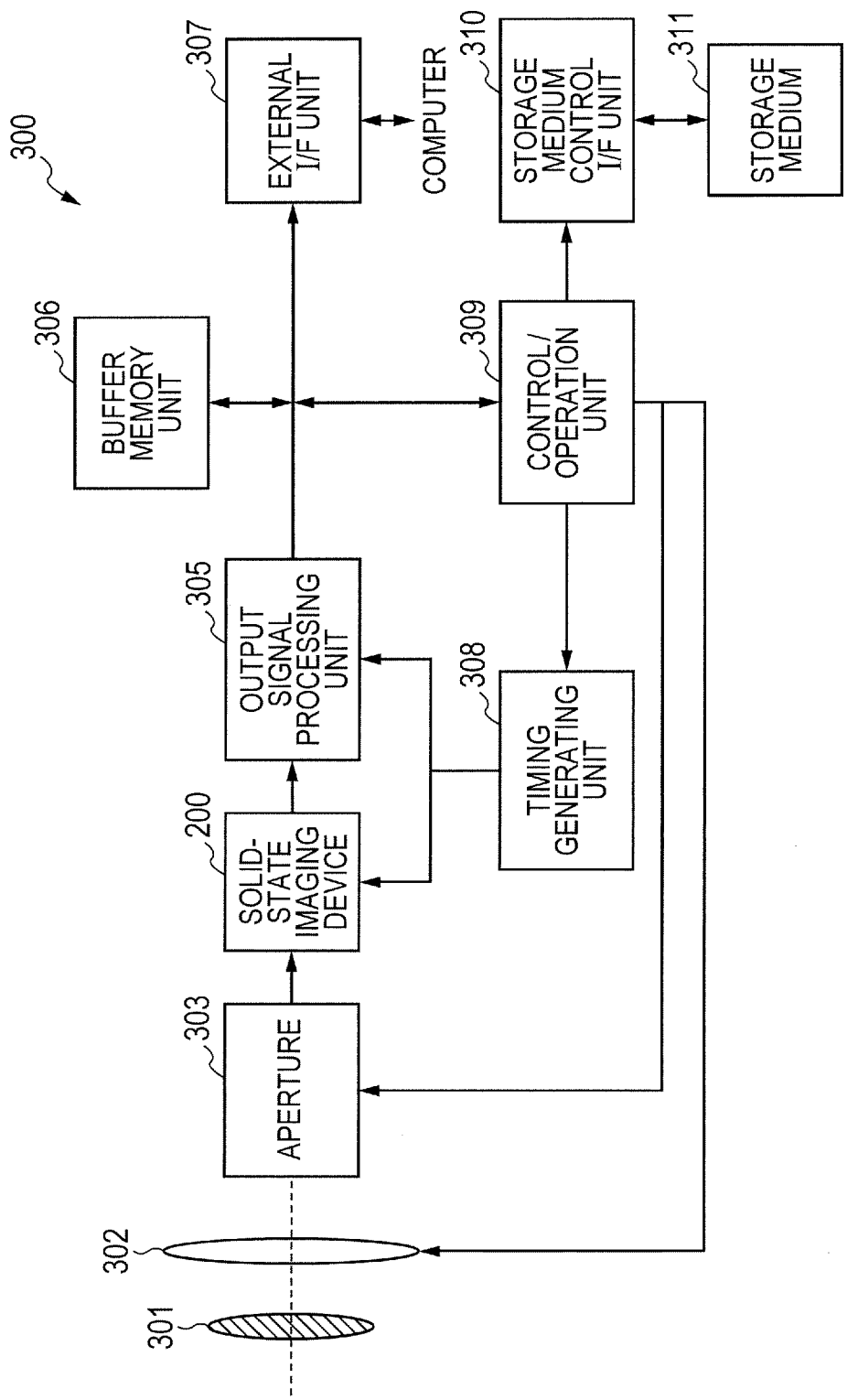
FIG. 12 is a block diagram illustrating one example of the configuration of an imaging system according to a fifth embodiment of the present invention.

An imaging system according to a fifth embodiment of the present invention will be described with reference to FIG. 12. In FIG. 12, constituent elements that are the same as in the solid-state imaging device according to each of the first to fourth embodiments illustrated in FIG. 1 to FIG. 11 are denoted by the same reference characters as in FIG. 1 to FIG. 11, and a description of those constituent elements is omitted or abbreviated hereunder.

FIG. 12 is a block diagram illustrating the imaging system according to the present embodiment.

In the present embodiment, an example is described in which a solid-state imaging device described in the first to fourth embodiments is applied to an imaging system. A digital still camera, a digital camcorder, and a surveillance camera may be mentioned as examples of the imaging system.

As illustrated in FIG. 12, an imaging system 300 of the present embodiment includes a barrier 301, a lens system 302, an aperture 303, a solid-state imaging device 200 and an output signal processing unit 305. The imaging system 300 also includes a buffer memory unit 306, an external I/F unit 307, a timing generating unit 308, a control/operation unit 309, a storage medium control I/F unit 310 and a storage medium 311. The solid-state imaging device 200 described in the foregoing embodiments is used as the solid-state imaging device 200.

The lens system 302 is a member for causing an optical image of a subject to be imaged on the solid-state imaging device 200. The aperture 303 is a member for varying the amount of light that passes through the lens system 302. The barrier 301 is a component for protecting the lens system 302. An optical system including the lens system 302 and the aperture 303 causes light from a subject to be imaged on the imaging region 1 in which the plurality of pixels 100 is arranged in a two-dimensional matrix shape of the solid-state imaging device 200, to thereby form an image of the subject. The solid-state imaging device 200 outputs signals that are in accordance with the light that was imaged on the imaging region 1. The timing generating unit 308 is a component that outputs various timing signals based on control by the control/operation unit 309 to control the drive timing of the solid-state imaging device 200 and the output signal processing unit 305. Note that timing signals or the like may also be input from outside the solid-state imaging device 200, and it is sufficient if the imaging system includes at least the solid-state imaging device 200 and the output signal processing unit 305 that processes output signals that were output from the solid-state imaging device 200.

The signals that are output from the solid-state imaging device 200 are input to the output signal processing unit 305 that is an image processing unit. The output signal processing unit 305 has a digital signal processing unit, and as necessary, subjects a signal that is output from the solid-state imaging device 200 to processing in accordance with a method determined by a program or the like, such as various kinds of correction or compression, and outputs the processed signal. A signal obtained after the processing by the output signal processing unit 305 is performed is transmitted as image data to the buffer memory unit 306, the external I/F (interface) unit 307 and the control/operation unit 309. The buffer memory unit 306 is a member for temporarily storing image data. The external I/F (interface) unit 307 is a member for communicating with an external computer or the like. A storage medium control I/F (interface) unit 310 for performing recording and readout operations with respect to a storage medium is connected to the control/operation unit 309, and can record or read out imaging data on or from the detachable storage medium 311 such as a semiconductor memory.

The control/operation unit 309 carries out general control of the operations of the imaging system, and controls driving of the lens system 302, the aperture 303, the timing generating unit 308, and the storage medium control I/F unit 310 and the like. The control/operation unit 309 also includes, for example, an unillustrated storage apparatus that is a storage medium. Programs that are necessary for controlling operations of the imaging system are recorded on the storage medium. The control/operation unit 309 also supplies signals for switching a drive mode in accordance with, for example, a user operation, into the imaging system. Signals for changing a row to be read out or a row to be reset, signals for changing an angle of view accompanying electronic zooming, or signals for shifting the angle of view accompanying electronic vibration control may be mentioned as specific examples of such signals.

By constructing an imaging system using the solid-state imaging device according to the first to fourth embodiments in the manner described above, a high-performance imaging system can be realized.

Modified Embodiments

The present invention is not limited to the above described embodiments, and various modifications are possible.

For example, although in the above described first to third embodiments one selectable additional capacitor is connected to the FD node and in the above described fourth embodiment two selectable additional capacitors are connected to the FD node, the number of selectable additional capacitors to be connected to the FD node is not limited to the numbers described in the aforementioned embodiments. A configuration may also be adopted in which three or more selectable additional capacitors are connected to the FD node.

Further, although in the above described first to fourth embodiments the floating diffusion capacitor 107 and the additional capacitor 108 are reset after reading out the charges from the floating diffusion capacitor 107 (step from time t4 to t5), resetting of the floating diffusion capacitor 107 and the additional capacitor 108 need not necessarily be performed. In such case, if performing correlated double sampling, after reading out the charges from the combined capacitor (step from time t10 to t11), it is sufficient to reset the floating diffusion capacitor 107 and the additional capacitor 108 and read out the output signals that are based on the reset potential.

In addition, although in the above described first to fourth embodiments a noise component is removed by acquiring an output signal based on the reset potential and performing correlated double sampling, the correlated double sampling need not necessarily be performed.

Furthermore, an imaging system to which the solid-state imaging devices of the first to fourth embodiments can be applied is not limited to the imaging system described in the fifth embodiment, and the solid-state imaging devices of the aforementioned embodiments can be widely applied to various imaging systems that use a solid-state imaging device.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-094462, filed May 1, 2014 which is hereby incorporated by reference herein in its entirety.

What is claimed is:

1. A method of driving a solid-state imaging device having a pixel including a photoelectric conversion element that generates signal charges by photoelectric conversion, an amplifier transistor, a first capacitor electrically connected to an input node of the amplifier transistor, a second capacitor electrically connectable to the input node, and a switch for switching an electrical path between the input node and the second capacitor between a conductive state and a non-conductive state, the method comprising:

transferring at least a part of charges of the signal charges generated by the photoelectric conversion element from the photoelectric conversion element to the first capacitor with switching the switch in the non-conductive state;

outputting by the amplifier transistor a first signal based on the part of the charges that the first capacitor holds;

resetting the first capacitor holding the part of the charges and the second capacitor with switching the switch in the conductive state;

transferring, after resetting the first capacitor and the second capacitor, with holding the switch in the conductive state, other part of the charges of the signal charges from the photoelectric conversion element to a combined capacitor of the first capacitor and the second capacitor;

outputting by the amplifier transistor a second signal based on the other part of the charges that the combined capacitor holds; and generating an output signal in accordance with the first signal, the second signal, and a capacitance ratio between the first capacitor and the combined capacitor.

2. The method of driving a solid-state imaging device according to claim 1, further comprising:

resetting a potential of the first capacitor, and outputting by the amplifier transistor a third signal based on a reset potential of the first capacitor, before holding the part of the charges by the first capacitor; and subtracting the third signal from the first signal before generating the output signal.

3. The method of driving a solid-state imaging device according to claim 1, further comprising:

outputting by the amplifier transistor a fourth signal based on a reset potential of the combined capacitor, after resetting the combined capacitor; and subtracting the fourth signal from the second signal before generating the output signal.

4. The method of driving a solid-state imaging device according to claim 1, wherein the first capacitor is a floating diffusion capacitor.

5. The method of driving a solid-state imaging device according to claim 1, wherein the pixel has a plurality of the second capacitors.

6. A solid-state imaging device comprising:

a pixel including:
  a photoelectric conversion element that generates signal charges by photoelectric conversion;
  an amplifier transistor;
  a first capacitor electrically connected to an input node of the amplifier transistor;
  a second capacitor electrically connectable to the input node;
  a switch for switching an electrical path between the input node and the second capacitor between a conductive state and a non-conductive state;
  a transfer transistor electrically connected to the photoelectric conversion element and the input node; and
  a reset transistor electrically connected to the input node;

a controller; and an output signal generator, wherein the controller:

causes the transfer transistor to transfer at least a part of charges of the signal charges generated by the photoelectric conversion element from the photoelectric conversion element to the first capacitor with switching the switch in the non-conductive state;

causes the amplifier transistor to output a first signal based on the part of the charges that the first capacitor holds;

causes the reset transistor to reset the first capacitor holding the part of the charges and the second capacitor with switching the switch in the conductive state;

causes the transfer transistor to transfer, after resetting the first capacitor and the second capacitor, with holding the switch in the conductive state, other part of charges of the signal charges from the photoelectric conversion element to a combined capacitor of the first capacitor and the second capacitor; and causes the amplifier transistor to output a second signal based on the other part of the charges that the combined capacitor holds, and wherein the output signal generator generates an output signal in accordance with the first signal, the second signal, and a capacitance ratio between the first capacitor and the combined capacitor.

7. The solid-state imaging device according to claim 6, wherein prior to causing the transfer transistor to transfer at least the part of the charges of the signal charges generated by the photoelectric conversion element to the first capacitor with switching the switch in the non-conductive state, the controller places the switch in the non-conductive state, and causes the reset transistor to reset the first capacitor.

8. The solid-state imaging device according to claim 6, wherein:

the switch is a transistor having one main node electrically connected to the reset transistor and another main node electrically connected to the input node, and switches an electrical path between the one main node and the other main node between the conductive state and the non-conductive state in accordance with a signal that is input to a control node, and the second capacitor is provided underneath the control node.

9. The solid-state imaging device according to claim 6, wherein the first capacitor is a floating diffusion capacitor.

10. The solid-state imaging device according to claim 6, wherein an amount of the charges that the first capacitor is capable of holding is less than an amount of the signal charges that the photoelectric conversion element accumulates.

11. The solid-state imaging device according to claim 6, wherein a capacitance value of the second capacitor is larger than a capacitance value of the first capacitor.

12. The solid-state imaging device according to claim 6, wherein a capacitance value of the first capacitor is less than or equal to a capacitance value corresponding to an optical input amount with respect to which a photo-shot noise component is more dominant than a random noise component.

13. The solid-state imaging device according to claim 6, wherein the pixel includes a plurality of the second capacitors.

14. An imaging system, comprising:
a solid-state imaging device; and
an optical system for imaging an image of a subject onto the solid-state imaging device,
wherein the solid-state imaging device comprises:
solid-state imaging device comprising:
a pixel including:
    a photoelectric conversion element that generates signal charges by photoelectric conversion;
    an amplifier transistor;
    a first capacitor electrically connected to an input node of the amplifier transistor;
    a second capacitor electrically connectable to the input node;
    a switch for switching an electrical path between the input node and the second capacitor between a conductive state and a non-conductive state;
    a transfer transistor electrically connected to the photoelectric conversion element and the input node; and
    a reset transistor electrically connected to the input node;
a controller; and
an output signal generator,
wherein the controller:
    causes the transfer transistor to transfer at least a part of charges of the signal charges generated by the photoelectric conversion element from the photoelectric conversion element to the first capacitor with switching the switch in the non-conductive state;
    causes the amplifier transistor to output a first signal based on the part of the charges that the first capacitor holds;
    causes the reset transistor to reset the first capacitor holding the part of the charges and the second capacitor with switching the switch in the conductive state;
    causes the transfer transistor to transfer, after resetting the first capacitor and the second capacitor, with holding the switch in the conductive state, other part of charges of the signal charges from the photoelectric conversion element to a combined capacitor of the first capacitor and the second capacitor; and
    causes the amplifier transistor to output a second signal based on the other part of the charges that the combined capacitor holds, and
wherein the output signal generator generates an output signal in accordance with the first signal, the second signal, and a capacitance ratio between the first capacitor and the combined capacitor.

* * * * *